(12) United States Patent
Nakadori et al.

(10) Patent No.: US 8,195,360 B2
(45) Date of Patent: Jun. 5, 2012

(54) CURVE RADIUS ESTIMATING DEVICE (75) Inventors: Minoru Nakadori, Toyota (JP); Minoru Saeki, Seto (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 0 days.

(21) Appl. No.: 13/180,136

(22) Filed: Jul. 11, 2011

(65) Prior Publication Data

US 2011/0270466 A1    Nov. 3, 2011

Related U.S. Application Data (63) Continuation of application No. PCT/JP2009/050986, filed on Jan. 22, 2009.

(51) Int. Cl.
*G06F 7/00* (2006.01)
(52) U.S. Cl. ............................................. 701/36
(58) Field of Classification Search .............. 701/41, 701/72, 93, 96, 1, 36
See application file for complete search history.

(56) References Cited

U.S. PATENT DOCUMENTS

| 7,447,577 | B2 | 11/2008 | Hattori et al. |
| 7,626,533 | B2 | 12/2009 | Cong et al. |
| 2001/0053955 | A1 | 12/2001 | Shirai et al. |
| 2005/0225477 | A1 | 10/2005 | Cong et al. |

FOREIGN PATENT DOCUMENTS

| JP | 08-219799 | * | 8/1996 |
| JP | 8-219799 A | | 8/1996 |
| JP | 8-279099US | | 10/1996 |
| JP | 2000-002535 | | 1/2000 |
| JP | 2001-328451 | | 11/2001 |
| JP | 2004-217178 | | 8/2004 |
| JP | 2007-022247 | | 2/2007 |
| JP | 2007-516906 | | 6/2007 |
| JP | 2007-331608 | | 12/2007 |
| JP | 2008-176400 | | 7/2008 |

OTHER PUBLICATIONS

International Search Report issued on Apr. 7, 2009 for PCT/JP09/050986, filed Jan. 22, 2009, with English Translation.
International Written Opinion issued on Apr. 7, 2009 for PCT/JP09/050986, filed Jan. 22, 2009.
Chapter II Report issued on Apr. 6, 2011 for PCT/JP09/050986, filed Jan. 22, 2009.

* cited by examiner

*Primary Examiner* — Kim T Nguyen
(74) *Attorney, Agent, or Firm* — Oblon, Spivak, McClelland, Maier & Neustadt, L.L.P.

(57) ABSTRACT

A curve radius estimating device (100) configured to estimate a curve radius of a lane on which a self vehicle is driving includes a first curve radius calculating part (110) configured to calculate a first curve radius on a steering angle, a second curve radius calculating part (111) configured to calculate a second curve radius on a yaw rate, and a curve radius estimating part (112) configured to estimate a curve radius by combining the first curve radius and the second curve radius at a predetermined combination ratio. The curve radius estimating part (112) changes the predetermined combination ratio depending on a vehicle speed.

20 Claims, 9 Drawing Sheets

CURVE RADIUS ESTIMATING DEVICE

CROSS-REFERENCE TO RELATED APPLICATIONS

The present application is a U.S. continuation application filed under 35 U.S.C. 111 (a) claiming benefit under 35 U.S.C. 120 and 365 (c) of PCT application No. PCT/JP2009/050986, filed on Jan. 22, 2009, the entire contents of which are hereby incorporated by reference.

TECHNICAL FIELD

The present invention relates to a curve radius estimating device which estimates a curve radius of a lane on which a vehicle is driving. In particular, the present invention relates to a curve radius estimating device which more accurately estimates a curve radius at low speed area.

BACKGROUND ART

Conventionally, an inter-vehicular distance controlling device is known (see Patent Document 1 for example). The inter-vehicular distance controlling device determines a curve radius of a lane on which a self vehicle is driving based on a steering angle detected by a steering sensor, recognizes a leading vehicle on the lane whose curve radius has determined, and controls an inter-vehicular distance between the self vehicle and the leading vehicle passing through the curve.

A travel path estimating device is also known (see Patent Document 2 for example). The travel path estimating device derives a conclusive curve radius by averaging a curve radius calculated on a steering angle or a yaw rate and a curve radius calculated on a motion of a stationary object located in front of a self vehicle and detected by a laser sensor. Then the travel path estimating device estimates a travel path of the self vehicle.

A curve radius estimating device which estimates a curve radius when a self vehicle is driving at a speed of more than 10 kilometers per hour (not at very slow speed) is also known (see Patent Document 3 for example). The curve radius estimating device corrects a curve radius calculated on a yaw rate with a steering angle and estimates a conclusive curve radius.

A vehicle controlling device which controls an inter-vehicular distance between a self vehicle and a leading vehicle is also known (see Patent Document 4 for example). The vehicle controlling device derives a curvature radius of a road on which a self vehicle is driving based on a yaw rate and a steering angle, recognizes a leading vehicle on the road having the derived curvature radius, and then controls the inter-vehicular distance between the self vehicle and the leading vehicle.

[Patent Document 1] Japanese Patent Publication No. H08-279099
[Patent Document 2] Japanese Patent Publication No. 2001-328451
[Patent Document 3] Japanese Patent Publication No. 2004-217178
[Patent Document 4] Japanese Patent Publication No. 2007-331608

DISCLOSURE OF THE INVENTION

Problems to be Solved by the Invention

However, any of the devices described in Patent Documents 1 to 4 does not target the case where a self vehicle is driving at low speed. Patent Documents 1 to 4 do not specify a target speed area (Patent Documents 1 and 2) or target only the case where the self vehicle is driving at a speed more than a predetermined speed (Patent Documents 3 and 4).

Thus, Patent Documents 1 to 4 do not disclose a switchover between estimating method of a curve radius suitable for a low speed driving and estimating method of a curve radius suitable for a driving other than the low speed driving, or procedures for a boundary speed area, either. Patent Documents 1 to 4 only disclose general purpose calculation of a curve radius based on a steering angle (Patent Document 1), general purpose calculation of a curve radius based on either a steering angle or a yaw rate (Patent Document 2), general purpose calculation of a curve radius based mainly on a yaw rate while considering a steering angle secondarily (Patent Document 3), or general purpose calculation of a curve radius based on both a steering angle and a yaw rate (Patent Document 4). Thus, if curve radius calculating methods disclosed in Patent Documents 1 to 4 are applied to a full-range Adaptive Cruise Control (ACC) which requires a reliable estimation of a curve radius at low speed area as well as at high speed area, reliability of curve radius estimation at low speed area fall short.

In consideration of the above, the present invention is intended to provide a curve radius estimating device applicable to a full-range ACC by estimating a curve radius at low speed area more reliably while maintaining high reliability for estimation of a curve radius at speed areas other than the low speed area.

Means for Solving Problems

To meet the above objective, a curve radius estimating device according to a first invention is a curve radius estimating device configured to estimate a curve radius of a lane on which a self vehicle is driving comprises a first curve radius calculating part configured to calculate a first curve radius on a steering angle, a second curve radius calculating part configured to calculate a second curve radius on a yaw rate, and a curve radius estimating part configured to estimate a curve radius by combining the first curve radius and the second curve radius at a predetermined combination ratio, wherein the curve radius estimating part changes the predetermined combination ratio depending on a vehicle speed.

A second invention is a curve radius estimating device according to the first invention, wherein the curve radius estimating part gradually changes the predetermined combination ratio depending on a vehicle speed.

A third invention is a curve radius estimating device according to the first invention, wherein the curve radius estimating part changes the predetermined combination ratio depending on a bank angle or a road gradient of a road on which a self vehicle is driving.

Effects of the Invention

According to the above means, the present invention can provide a curve radius estimating device applicable to a full-range ACC by estimating a curve radius at low speed area more reliably while maintaining high reliability for estimation of a curve radius at speed areas other than the low speed area.

EXPLANATION OF REFERENCE NUMERALS 100 curve radius estimating device
101, 201, 301 controlling part
102, 303 yaw rate sensor
103, 304 steering angle sensor
104, 305 vehicle speed sensor
110, 310 first curve radius calculating part
111, 311 second curve radius calculating part
112, 312 curve radius estimating part
200 inter-vehicular distance controlling device
202, 302 radar
203, 306 throttle actuator
204, 307 brake actuator
210, 313 leading vehicle recognizing part
211, 314 inter-vehicular distance controlling part
SYS1, SYS2 inter-vehicular distance controlling system

BEST MODE FOR CARRYING OUT THE INVENTION

With reference to accompanying figures, the best mode for carrying out the present invention is described below with embodiments.

[First Embodiment]

Figure 1:
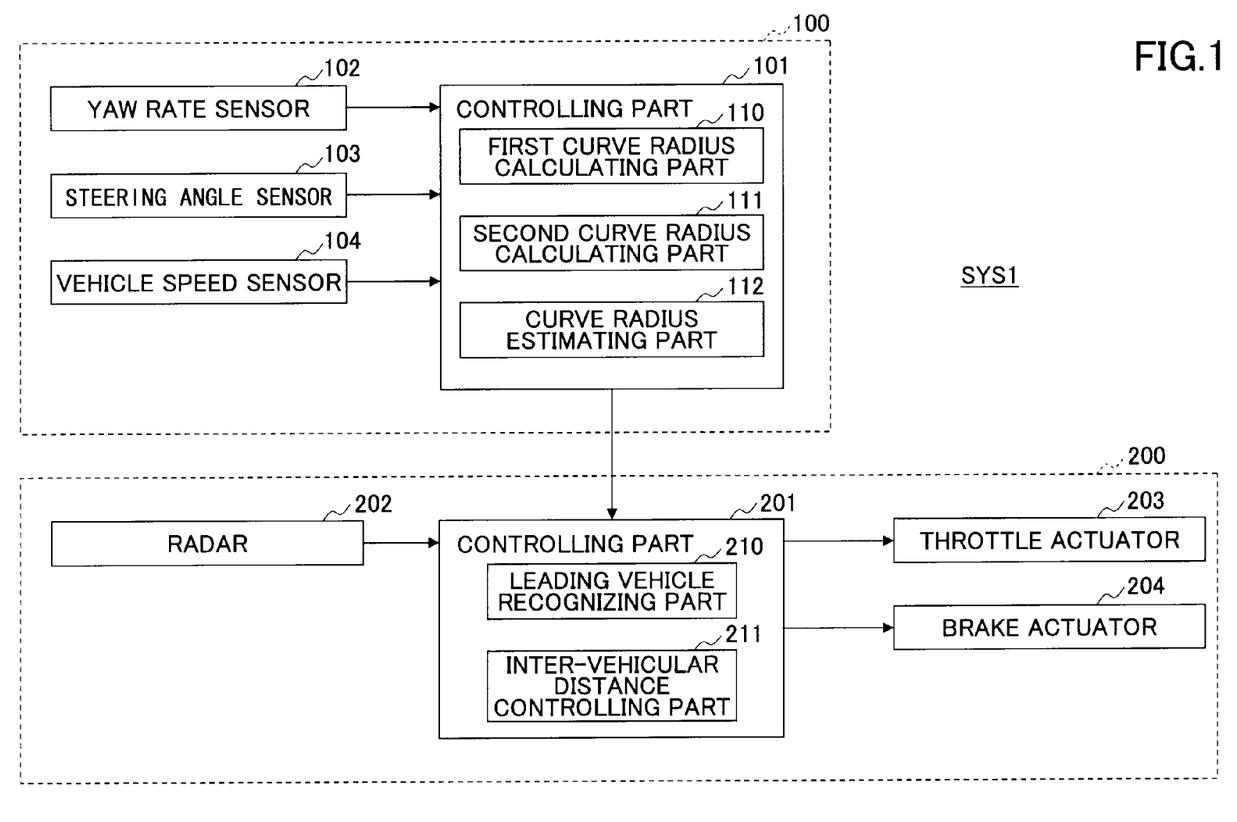
FIG. 1 is a block diagram illustrating the first embodiment of a curve radius estimating device.

FIG. 1 is a block diagram illustrating a configuration of an inter-vehicular distance controlling system including a first embodiment of a curve radius estimating device. The inter-vehicular distance controlling system SYS1 has a curve radius estimating device 100 and an inter-vehicular distance controlling device 200.

The curve radius estimating device 100 is an in-vehicle device which estimates a curve radius of a lane on which a self vehicle is driving. The curve radius estimating device 100 separately calculates two provisional curve radii corresponding to respective outputs of a yaw rate sensor 102 and a steering angle sensor, estimates a conclusive curve radius by combining those two calculated provisional curve radii, and outputs the estimated result to the inter-vehicular distance controlling device 200. Meanwhile, the curve radius estimating device 100 determines a combination ratio of those two calculated provisional curve radii depending on a output of a vehicle speed sensor 104.

The inter-vehicular distance controlling device 200 is an in-vehicle device which controls a speed of a self vehicle so that an inter-vehicular distance between the self vehicle and a leading vehicle becomes constant. The inter-vehicular distance controlling device 200 recognizes a leading vehicle driving on the same lane as the self vehicle drives based on the curve radius estimated by the curve radius estimating device 100 and a output of a radar 202, and accelerates or decelerates the self vehicle so that the inter-vehicular distance between the self vehicle and the leading vehicle becomes constant by sending out control signals to a throttle actuator 203 and a brake actuator 204.

A controlling part 101 of the curve radius estimating device 100 is a computer with a CPU, a RAM, a ROM, a NVRAM and the like. For example, with programs corresponding to each of a first curve radius calculating part 110, a second curve radius calculating part 111, and a curve radius estimating part 112 stored in the ROM, the controlling part 101 causes the CPU to run processes corresponding to respective parts.

The yaw rate sensor 102 detects an angular velocity (a yaw rate) of a vehicle. For example, the yaw rate sensor 102 is formed by attaching a piezoelectric ceramic on a U-shaped metallic plate. When a turning force is applied to the metallic plate, the metallic plate and the piezoelectric ceramic attached thereto strain and generate electric voltage. The yaw rate sensor 102 detects the angular velocity of the vehicle on this electric voltage value and outputs the detected value to the controlling part 101.

The steering angle sensor 103 detects a rotational angle of a steering shaft related to a steering angle of wheels. For example, the steering angle sensor 103 detects the rotational angle of the steering shaft by reading out with a MR element a magnetic resistance generated by a magnet embedded in the steering shaft, and outputs the detected value to the controlling part 101.

The vehicle speed sensor 104 detects a speed of a vehicle. For example, a MR element reads out as a magnetic resistance a variation in a magnetic field generated by a magnet attached to and rotating with each wheel. The vehicle speed sensor 104 detects a rotational rate of the wheel and a speed of a vehicle by retrieving the magnetic resistance as a pulse signal in proportion to the rotational rate, and outputs the detected value to the controlling part 101.

Similar to the controlling part 101, a controlling part 201 of the inter-vehicular distance controlling device 200 is a computer with a CPU, a RAM, a ROM, and the like. For example, with programs corresponding to each of a leading vehicle recognizing part 210 and an inter-vehicular distance controlling part 211 stored in the ROM, the controlling part 201 causes the CPU to run processes corresponding to respective parts.

The radar 202 detects an object around a vehicle. For example, the radar 202 is attached to a surface of a vehicle body, detects a position of a object (an other vehicle, an obstacle, a pedestrian, or the like) existing in front behind left and right of the self vehicle, a relative speed of the object relative to the self vehicle, a distance between the self vehicle and the objects, or the like, and outputs the detected value to the controlling part 201. Coverage of the radar 202 may change its direction or its width depending on a steering angle, a yaw rate, or a vehicle speed.

The throttle actuator 203 controls a throttle opening degree. For example, the throttle actuator 203 controls the throttle opening degree by opening or closing a throttle valve via a solenoid in response to a control signal from the controlling part 201.

The brake actuator 204 controls a braking force by a brake device. For example, the brake actuator 204 controls the braking force by increasing or decreasing a hydraulic pressure in a brake line via a solenoid in response to a control signal from the controlling part 201.

The following is an explanation of various parts in the controlling part 101.

The first curve radius calculating part 110 calculates a curve radius of a lane on which a self vehicle is driving based on the output of the yaw rate sensor 102. For example, the first curve radius calculating part 110 provisionally calculates a curve radius $R_{yaw}$ by dividing a vehicle speed by a yaw rate, and outputs the calculated result to the curve radius estimating part 112.

The second curve radius calculating part 111 calculates a curve radius of a lane on which a self vehicle is driving based on the output of the steering angle sensor 103. For example, the second curve radius calculating part 111 provisionally calculates a curve radius $R_{str}$ by dividing a wheelbase by tan θ (tangent of a steering angle θ) based on the Ackerman Geometry, and outputs the calculated result to the curve radius estimating part 112.

The curve radius estimating part 112 estimates a curve radius of a lane on which a self vehicle is driving. For example, the curve radius estimating part 112 estimates a conclusive curve radius by combining the curve radius $R_{yaw}$ calculated by the first curve radius calculating part 110 and the curve radius $R_{str}$ calculated by the second curve radius calculating part 111 at a predetermined combination ratio.

The combination ratio $R_{ratio}$ ranges between 0 and 1. Given that the estimate value of the conclusive curve radius is $R_n$, the estimate value $R_n$ is expressed by the relation $R_n = R_{yaw} \times R_{ratio} + R_{str} \times (1-R_{ratio})$.

Figure 2:
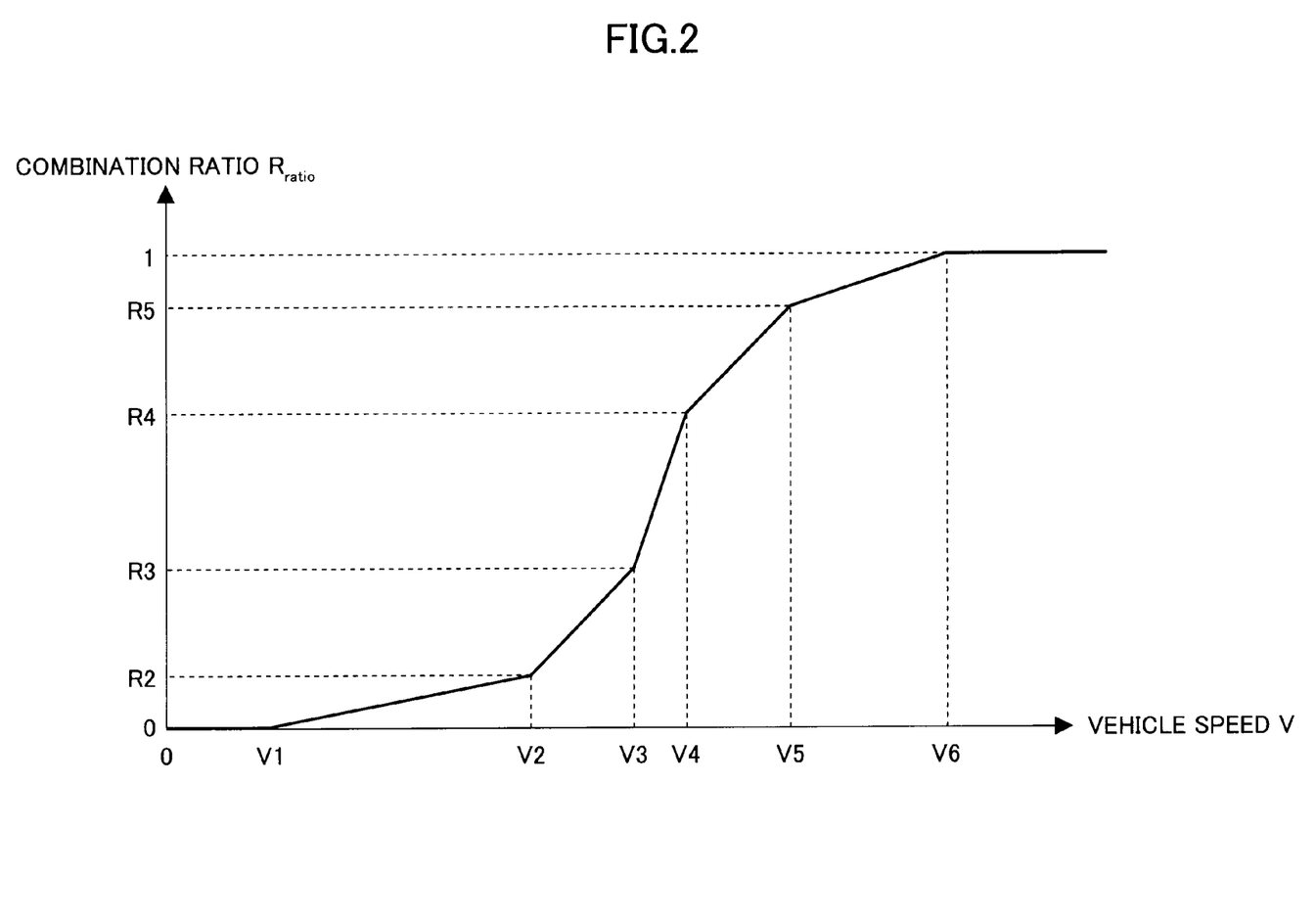
FIG. 2 is a first example illustrating a combination ratio map.

FIG. 2 is an example of a combination ratio map illustrating a correspondence relation between the combination ratio $R_{ratio}$ and the vehicle speed V. The vertical axis corresponds to the combination ratio $R_{ratio}$ and the horizontal axis corresponds to the vehicle speed V. It shows that, with increase of the vehicle speed V, the combination ratio $R_{ratio}$ increases from 0 as the minimum value to 1 as the maximum value according to an increasing rate with five steps. The combination ratio map may be preliminarily stored in the ROM or the NVRAM in the controlling part 101.

The increase of the combination ratio $R_{ratio}$ represents that the contribution ratio of the curve radius $R_{yaw}$ calculated on the yaw rate against the estimate value $R_n$ increases, while the contribution ratio of the curve radius $R_{str}$ calculated on the steering angle against the estimated value $R_n$ decreases.

In the case where the value of the combination ratio is "0", the estimate value $R_n$ of the conclusive curve radius is equal to $R_{str}$ (the curve radius $R_{yaw}$ has no effect on the estimate value $R_n$, the curve radius estimate value $R_n$ is estimated only on the curve radius $R_{str}$). Meanwhile, in the case where the value of the combination ratio is "1", the estimate value $R_n$ of the conclusive curve radius is equal to $R_{yaw}$ (the curve radius $R_{str}$ has no effect on the estimate value $R_n$, the curve radius estimate value $R_n$ is estimated only on the curve radius $R_{yaw}$).

Since the resolution of the yaw rate sensor 102 is restricted to a certain level (since, at low speed area, the output value of the yaw rate sensor 102 becomes low and the effect of the resolution on the output value becomes large), the curve radius $R_{str}$ calculated on the steering angle becomes more reliable than the curve radius $R_{yaw}$ calculated on the yaw rate at the low speed area. Meanwhile, with increase of the vehicle speed V, the output value of the yaw rate sensor 102 becomes large, the effect of the resolution on the output value becomes low, and thus the curve radius $R_{yaw}$ calculated on the yaw rate becomes more reliable than the curve radius $R_{str}$ calculated on the steering angle.

Referring to FIG. 2, in the case where the vehicle speed V is between V1 (2 kilometers per hour for example) and V2 (7 kilometers per hour for example), the combination ratio $R_{ratio}$ increases from value "0" to value R2 at a constant increasing rate α1 with increase of the vehicle speed V, and in the case where the vehicle speed V is between V2 and V3 (9 kilometers per hour for example), the combination ratio $R_{ratio}$ increases from value R2 to value R3 at a constant increasing rate α2 with increase of the vehicle speed V.

Similarly, in the case where the vehicle speed V is between V3 and V4 (10 kilometers per hour for example), the combination ratio $R_{ratio}$ increases from value R3 to value R4 at a constant increasing rate α3 with increase of the vehicle speed V, in the case where the vehicle speed V is between V4 and V5 (12 kilometers per hour for example), the combination ratio $R_{ratio}$ increases from value R4 to value R5 at a constant increasing rate α4 with increase of the vehicle speed V, and in the case where the vehicle speed V is between V5 and V6 (15 kilometers per hour for example), the combination ratio $R_{ratio}$ increases from value R5 to value "1" at a constant increasing rate α5 with increase of the vehicle speed V.

Figure 3:
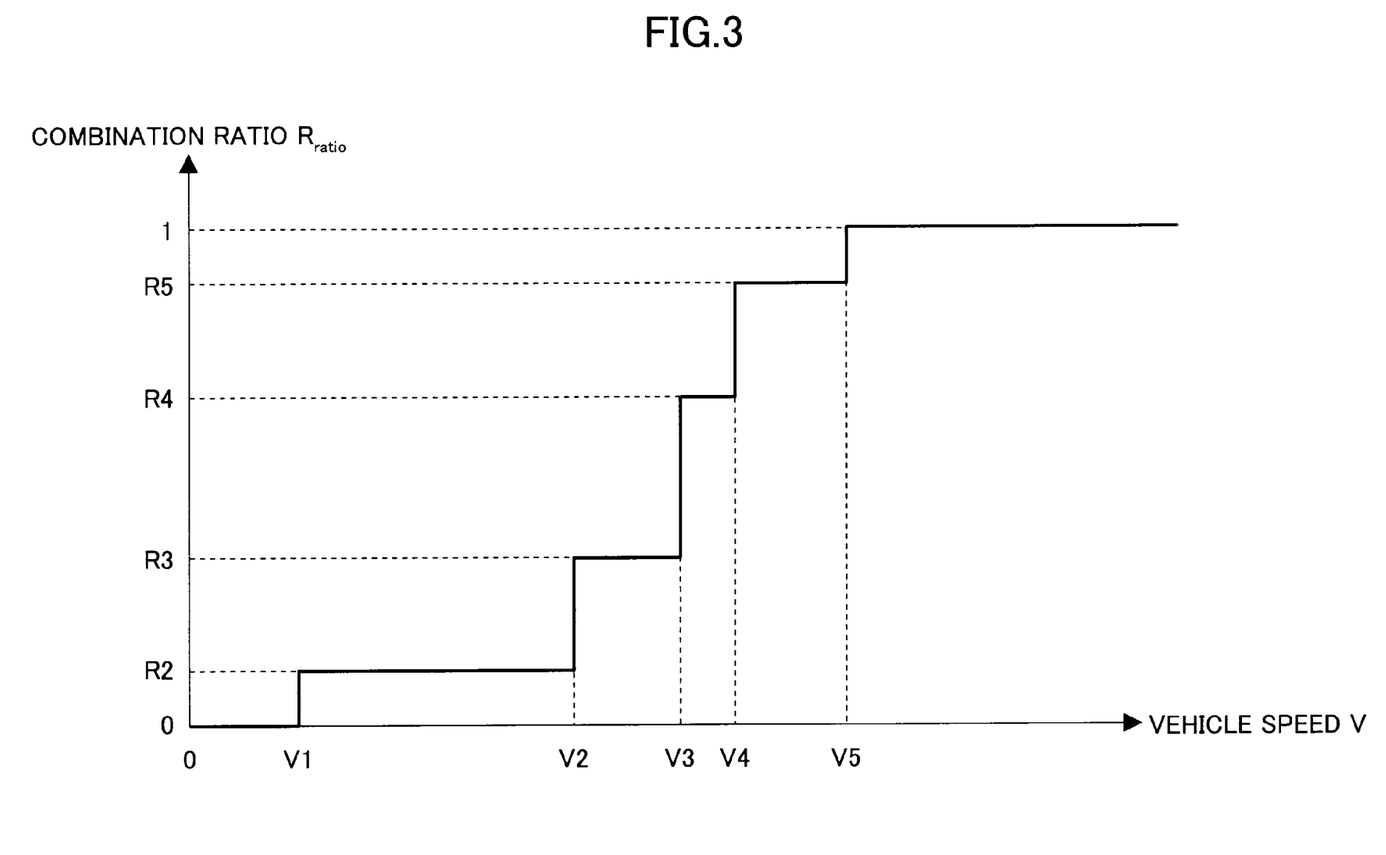
FIG. 3 is a second example illustrating a combination ratio map.
Figure 4:
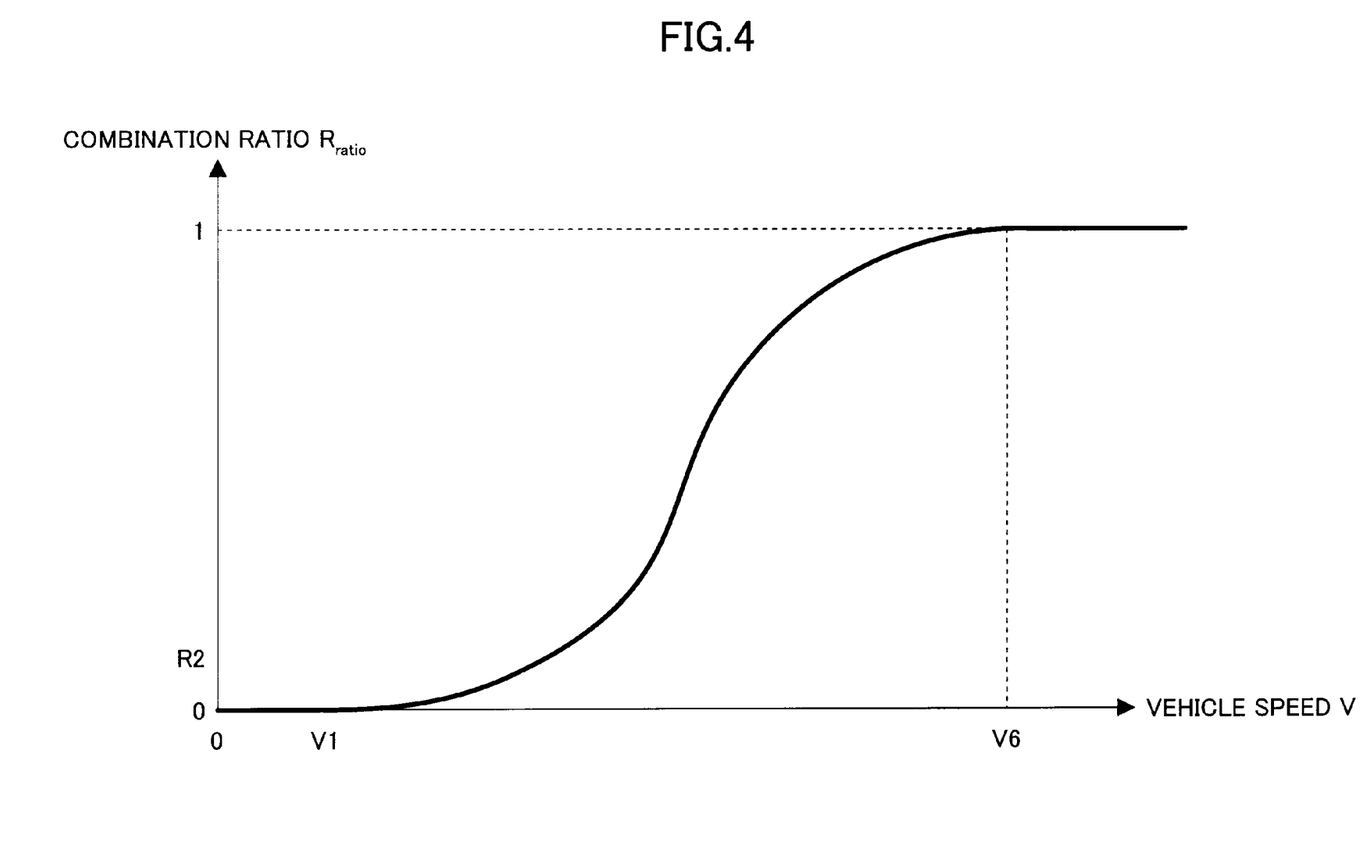
FIG. 4 is a third example illustrating a combination ratio map.
Figure 5:
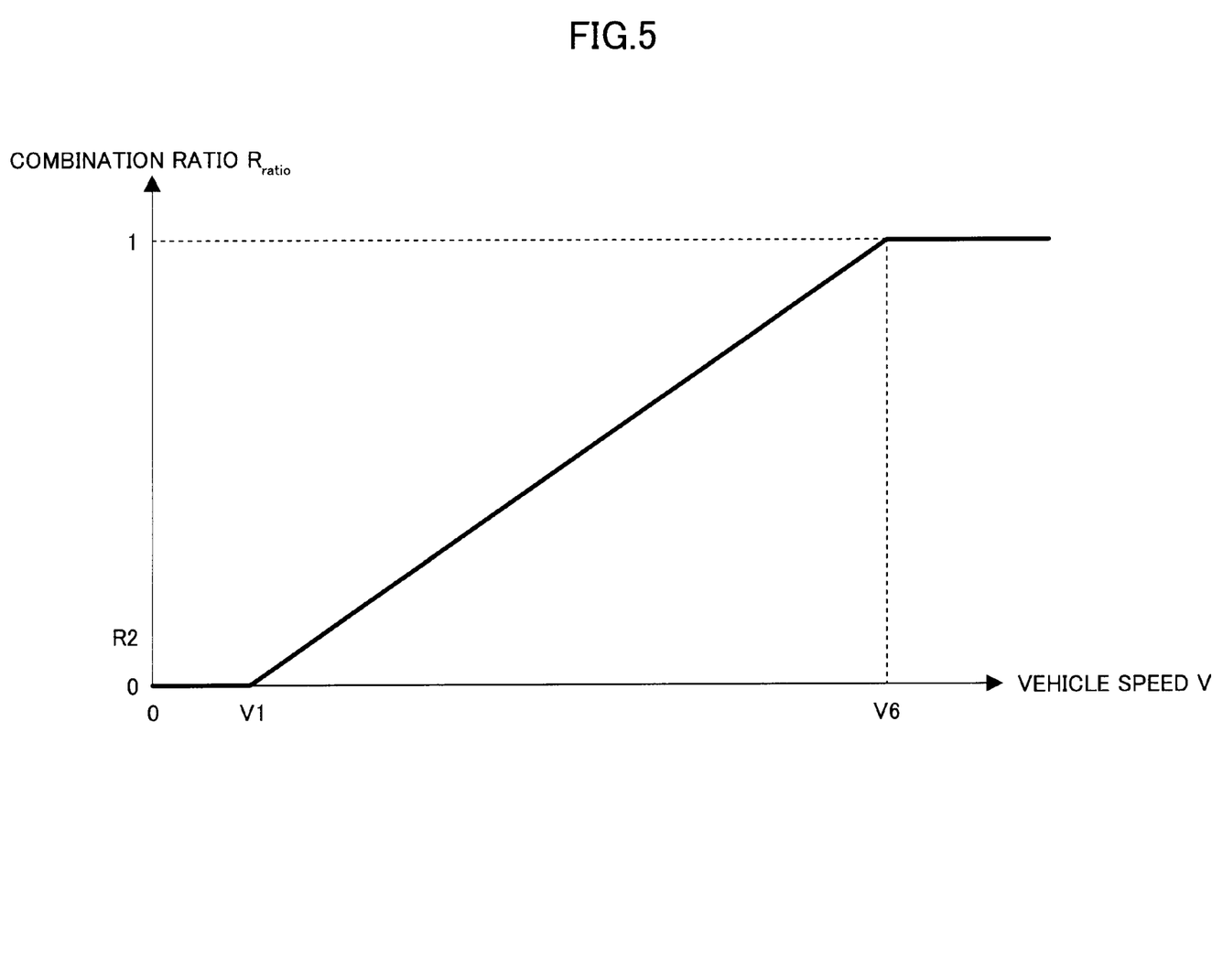
FIG. 5 is a forth example illustrating a combination ratio map.

FIGS. 3 to 5 are other examples of the combination ratio map illustrating a correspondence relation between the combination ratio $R_{ratio}$ and the vehicle speed V. FIG. 3 shows that the combination ratio $R_{ratio}$ increases in a staircase pattern with five steps with increase of the vehicle speed V from V1 to V5. FIG. 4 show that the combination ratio $R_{ratio}$ increases steplessly along a curve with increase of the vehicle speed V from V1 to V6. Also, FIG. 5 shows that the combination ratio $R_{ratio}$ increases at a constant increasing rate in the case where the vehicle speed V is between V1 and V6.

The value $V_{TH}$ of the vehicle speed V when the combination ratio $R_{ratio}$ reaches the value "1" (corresponding to the vehicle speed V6 in FIG. 2, the vehicle speed V5 in FIG. 3 or the like.) depends on the resolution of the yaw rate sensor 102, the higher (the finer) the resolution becomes, the smaller the value $V_{TH}$ becomes. This is because, if the resolution of the yaw rate sensor 102 is high, the yaw rate sensor 102 can detect more accurately the value of the yaw rate which is relatively small level in the case where the vehicle speed V is low and increase the reliability of the curve radius $R_{yaw}$ calculated on the yaw rate.

The following is an explanation of various parts in the controlling part 201.

The leading vehicle recognizing part 210 recognizes a leading vehicle driving on the same lane as the self vehicle drives. For example, the leading vehicle recognizing part 210 recognizes as a leading vehicle the closest vehicle within a driving trajectory Z determined by the leading vehicle recognizing part 210 based on the curve radius estimate value $R_n$ from the curve radius estimating device 100 out of more than one vehicle detected by the radar 202 within the coverage of the radar 202.

Figure 6:
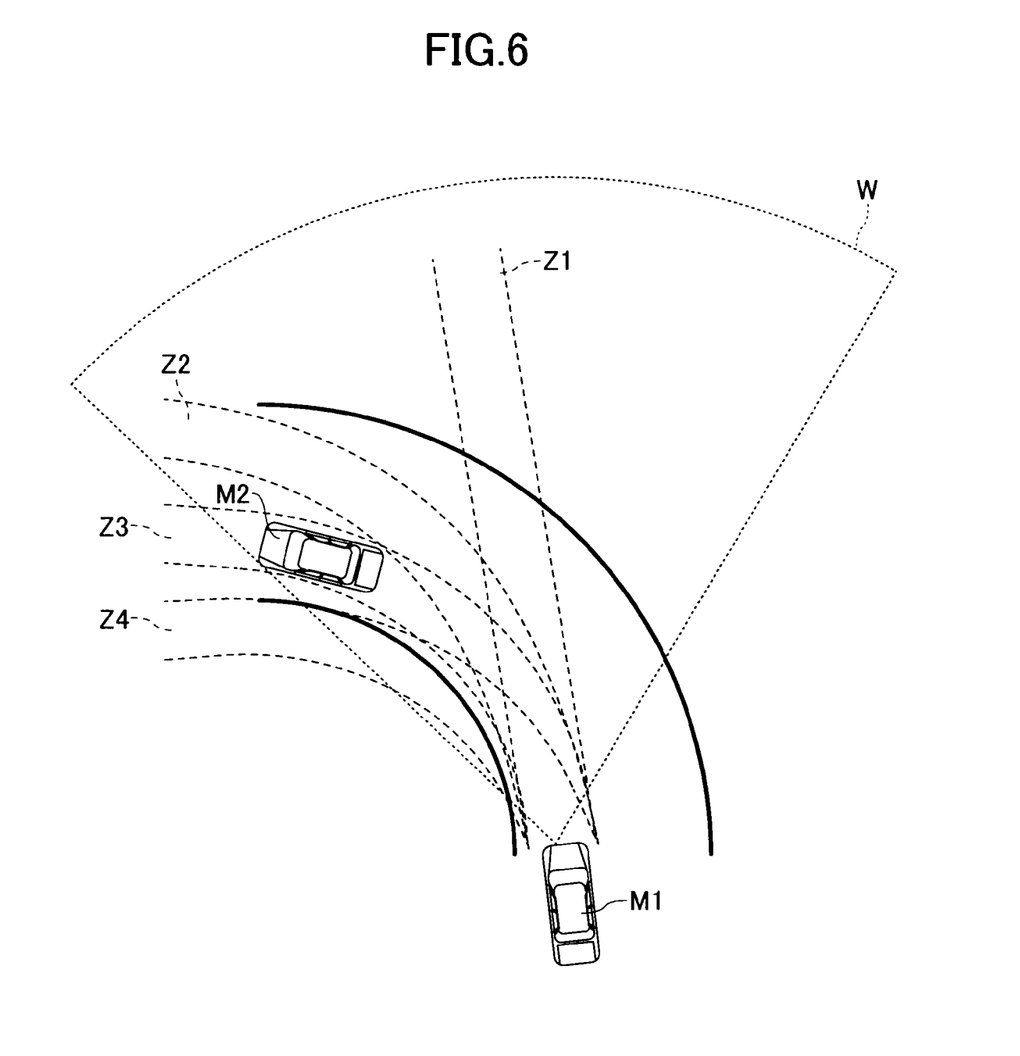
FIG. 6 is a diagram illustrating a recognition procedure of a leading vehicle.

FIG. 6 illustrates a recognition procedure of a leading vehicle. FIG. 6 shows a self vehicle M1 passing through a curve and a leading vehicle M2 driving in front of the self vehicle M1.

FIG. 6 also shows a coverage W of the radar 202 mounted on the self vehicle M1 and driving trajectories Z1 to Z4 determined based on the curve radius estimate value $R_n$ from the curve radius estimating device 100.

The driving trajectories Z1 to Z4 are the driving trajectories Z of the self vehicle M1 determined based on four different curve radius estimate values $R_n$. The driving trajectories Z shifts from Z1 to Z4 with decrease of the curve radius estimate value $R_n$. These four driving trajectories Z1 to Z4 are intended for explanation purposes only, the leading vehicle recognizing part 210 practically chooses a single driving trajectory Z based on a single curve radius estimate value $R_n$ from the curve radius estimating device 100. A center of a circle derived from the curve radius estimate value $R_n$ is, for example, present on a straight line extending in a vehicle width direction through the centroid of the self vehicle.

Firstly, the leading vehicle recognizing part 210 determines the driving trajectory Z of the self vehicle M1 based on the curve radius estimate value $R_n$ from the curve radius estimating device 100 (supposing that the driving trajectory Z3 is chosen), and then recognizes as the leading vehicle the closest vehicle M2 out of vehicles existing within the coverage W of the radar 202 and within the driving trajectory Z3 of the self vehicle M1.

If the leading vehicle recognizing part 210 chose the driving trajectory Z1, Z2, or Z4, since the vehicle M2 does not exist within the driving trajectory, the leading vehicle recognizing part 210 does not recognize the vehicle M2 as the leading vehicle.

The inter-vehicular distance controlling part 211 controls an inter-vehicular distance between a self vehicle and a leading vehicle. For example, the inter-vehicular distance controlling part 211 continuously calculates a distance between the self vehicle M1 and the leading vehicle M2 recognized by the leading vehicle recognizing part 210 based on the output of the radar 202, accelerates or decelerates the self vehicle M1 by sending out control signals to the throttle actuator 203 and the brake actuator 204 so that the distance is maintained at constant distance.

Figure 7:
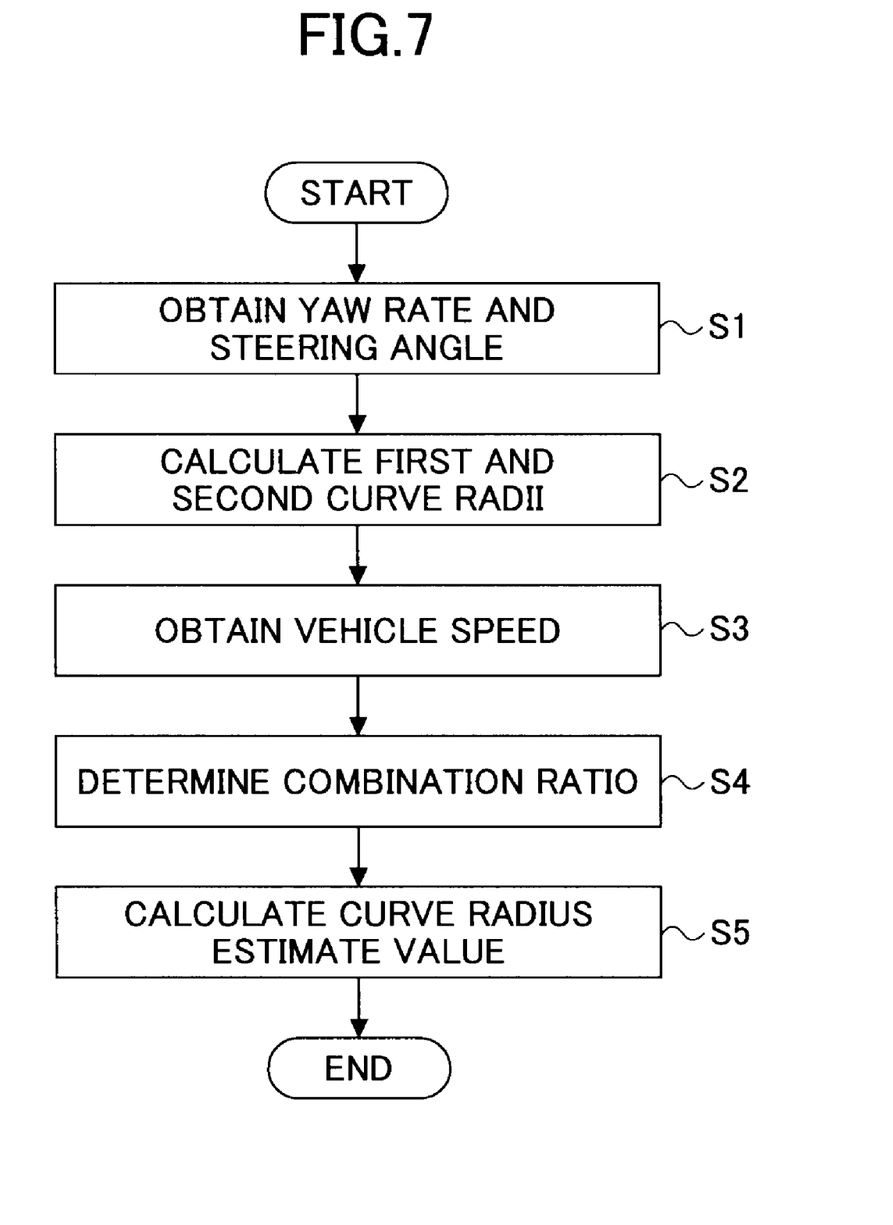
FIG. 7 is a flowchart illustrating a flow of curve radius estimating process.

Next, referring to FIG. 7, a process in which the curve radius estimating device 100 estimates the curve radius $R_n$ (hereinafter called "curve radius estimating process) will be explained. FIG. 7 is a flowchart illustrating a flow of the curve radius estimating process. The curve radius estimating device 100 runs the curve radius estimating process repeatedly at a predetermined frequency (every 10 milliseconds for example).

Firstly, the controlling part 101 obtains a value of a yaw rate from the yaw rate sensor 102 and a value of a steering angle from the steering angle sensor 103 (step S1).

Then, the controlling part 101 calculates by the first curve radius calculating part 110 the curve radius $R_{yaw}$ based on a value of a yaw rate, and calculates by the second curve radius calculating part 111 the curve radius $R_{str}$ based on a value of a steering angle (step S2).

Then, the controlling part 101 obtains a value of the vehicle speed V from the vehicle speed sensor 104 (step S3), and determines the combination ratio $R_{ratio}$ based on the obtained value of the vehicle speed V in reference to the combination ratio map stored in the ROM (step S4).

Then the controlling part 101 calculates by the curve radius estimating part 112 the curve radius estimate value $R_n$ by applying each of the curve radius $R_{yaw}$, the curve radius $R_{str}$, and the combination ratio $R_{ratio}$ to the computational expression $R_n = R_{yaw} \times R_{ratio} + R_{str} \times (1 - R_{ratio})$ (step S5), and outputs the calculated curve radius estimate value $R_n$ to the inter-vehicular distance controlling device 200.

Figure 8:
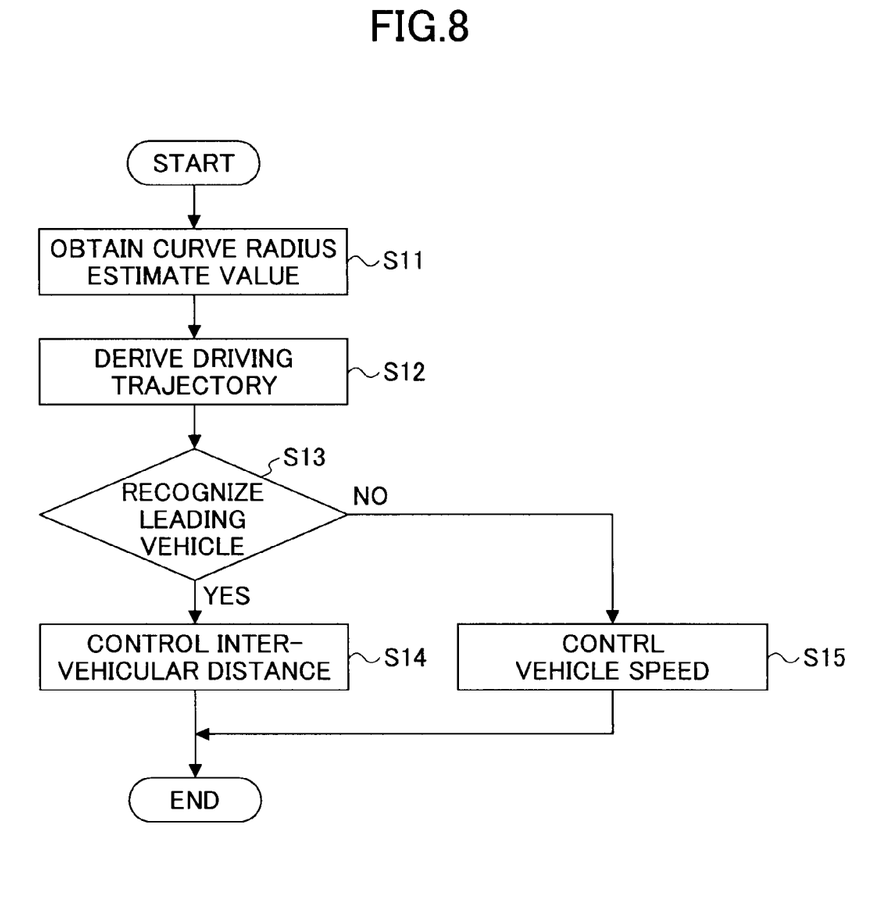
FIG. 8 is a flowchart illustrating a flow of inter-vehicular distance controlling process.

Next, referring to FIG. 8, a process in which the inter-vehicular distance controlling device 200 controls an inter-vehicular distance between a self vehicle and a leading vehicle (hereinafter called "inter-vehicular distance controlling process) will be explained. FIG. 8 is a flowchart illustrating a flow of the inter-vehicular distance controlling process. The inter-vehicular distance controlling device 200 repeatedly runs the inter-vehicular distance controlling process in response to the output of the curve radius estimate value $R_n$ from the curve radius estimating device 100.

Firstly, the controlling part 201 obtains the curve radius estimate value $R_n$ from the curve radius estimating device 100 (step S11).

Then, the controlling part 201 derives by the leading vehicle recognizing part 210 a driving trajectory which a self vehicle is to follow from the curve radius estimate value $R_n$ (step S12).

Then, the controlling part 201 recognizes as a leading vehicle the vehicle which is within the coverage of the radar 202 and within the driving trajectory and closest to the self vehicle by the leading vehicle recognizing part 210 (step S13).

If the controlling part 201 recognizes the leading vehicle (YES at step S13), by the inter-vehicular distance controlling part 211, the controlling part 201 outputs a control signal to the throttle actuator 203 or the brake actuator 204 and adjusts the inter-vehicular distance between the self vehicle and the leading vehicle so that the inter-vehicular distance becomes a predetermined distance (step S14).

Meanwhile, if the controlling part 201 does not recognize the leading vehicle (NO at step S13), by the inter-vehicular distance controlling part 211, the controlling part 201 outputs a control signal to the throttle actuator 203 and adjusts a vehicle speed of the self vehicle so that the vehicle speed becomes a predetermined speed (step S15).

With the above mentioned configuration, the inter-vehicular distance controlling system SYS1 according to the present embodiment increases the contribution ratio of the curve radius $R_{str}$ based on the steering angle which is regarded as reliable at low speed area when the self vehicle is driving at low speed. Hence the inter-vehicular distance controlling system SYS1 can control the inter-vehicular distance between the self vehicle and the leading vehicle while recognizing the leading vehicle more reliably even if the self vehicle is passing through a curve at low speed.

Also, the inter-vehicular distance controlling system SYS1 can control the inter-vehicular distance between the self vehicle and the leading vehicle continuously without losing sight of the leading vehicle even if the self vehicle approaches a curve at low speed.

Also, the inter-vehicular distance controlling system SYS1 gradually changes the contribution ratio of each of the curve radius $R_{yaw}$ and the curve radius $R_{str}$ against the curve radius estimate value $R_n$ in response to variation in the vehicle speed V. Hence the inter-vehicular distance controlling system SYS1 can control the inter-vehicular distance between the self vehicle and the leading vehicle continuously without losing sight of the leading vehicle while maintaining reliable estimation of the curve radius even if the self vehicle driving at high speed decelerates and approaches a curve, and passes through the curve at low speed.

Also, the inter-vehicular distance controlling system SYS1 can control the inter-vehicular distance between the self vehicle and the leading vehicle continuously without losing sight of the leading vehicle while maintaining reliable estimation of the curve radius even if the self vehicle passing through a curve at low speed accelerates and exits the curve.

Also, the inter-vehicular distance controlling system SYS1 can recognize a leading vehicle reliably even in the case where the self vehicle passes through the curve at low speed. Hence the inter-vehicular distance controlling system SYS1 is suitable for use in the full-range ACC.

[Second Embodiment]

Figure 9:
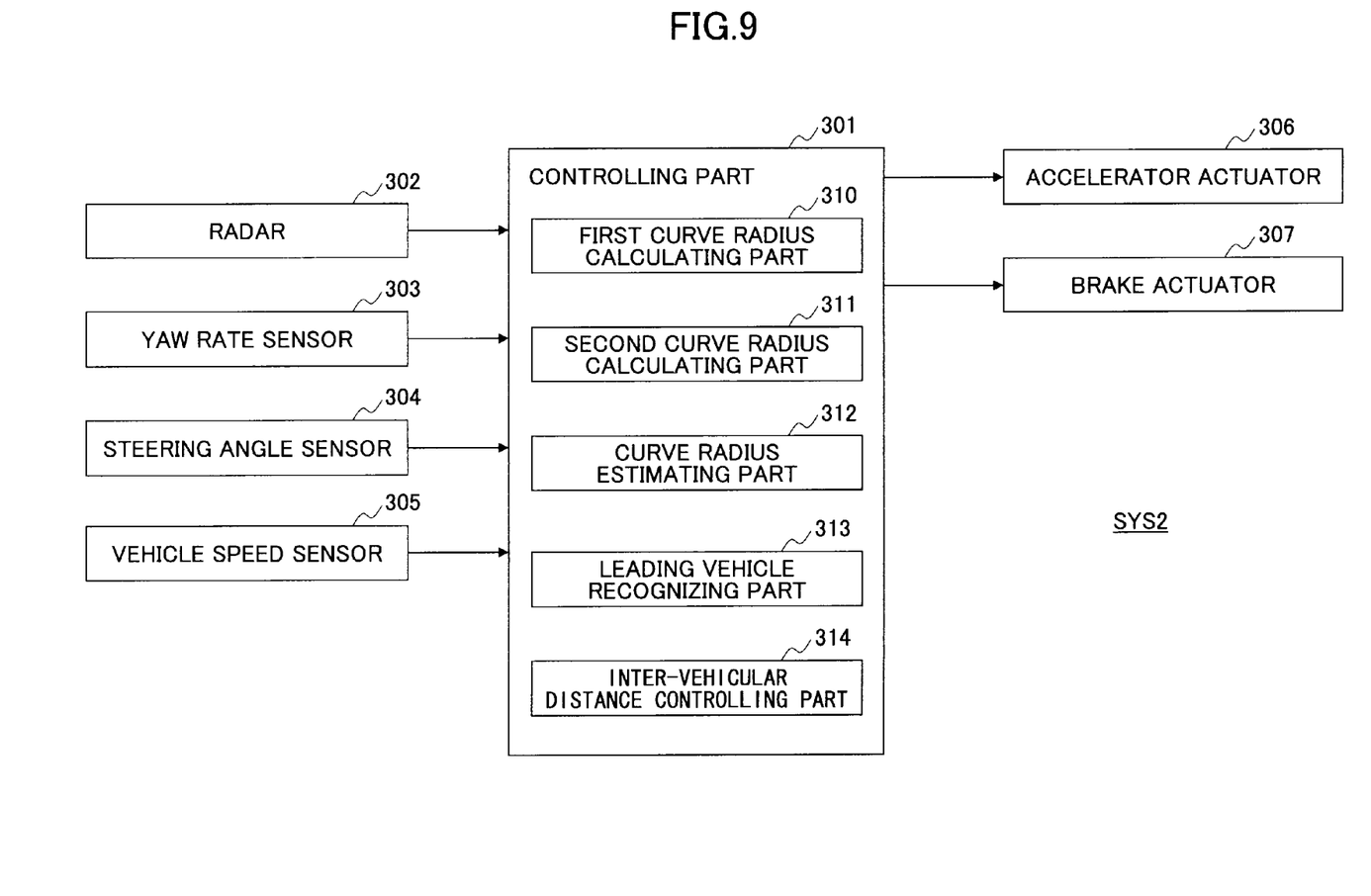
FIG. 9 is a block diagram illustrating the second embodiment of a curve radius estimating device.

FIG. 9 is a block diagram illustrating a configuration of an inter-vehicular distance controlling system including a second embodiment of a curve radius estimating device. The inter-vehicular distance controlling system SYS2 is different from the inter-vehicular distance controlling system SYS1 in respect that the curve radius estimating device 100 and the inter-vehicular distance controlling device 200 in FIG. 1 are integrated.

In this way, the inter-vehicular distance controlling system SYS2 is achieved by incorporating a first curve radius calculating part 310, a second curve radius calculating part 311, a curve radius estimating part 312, and a leading vehicle recognizing part 313 according to the present embodiment into the existing inter-vehicular distance controlling device.

The preferable embodiments of the present invention have been explained in detail. However, the present invention shall not be restricted to the above embodiments. Various changes and substitutions may be made to the above embodiments without departing from the scope of the present invention.

For example, in the above embodiments, the curve radius estimating part 112 derives the curve radius estimate value $R_n$ so that the total of the contribution ratio (corresponding to $R_{ratio}$) of the curve radius $R_{yaw}$ based on the yaw rate and the contribution ratio (corresponding to $(1-R_{ratio})$) of the curve radius $R_{str}$ based on the steering angle becomes the value "1" (100%). However, the total of the contribution ratio of the curve radius $R_{yaw}$ and the contribution ratio of the curve radius $R_{str}$ does not always have to be 100%. It may be possible to derive the curve radius estimate value $R_n$ while incorporating a contribution ratio of a curve radius calculated on other output value (for example, a curve radius calculated on shift in relative position of an image of lane marking obtained by an in-vehicle camera) or while calculating weighted average of the curve radius $R_{yaw}$ and the curve radius $R_{str}$. In the case where the weighted average is calculated, a weight of each of the curve radius $R_{yaw}$ and the curve radius $R_{str}$ is determined depending on the vehicle speed V. Basically, with decrease of the vehicle speed V, a weight of the curve radius $R_{str}$ relatively increases while a weight of the curve radius $R_{yaw}$ relatively decreases.

Also, in the above embodiments, the curve radius estimating part 112 derives the curve radius estimate value $R_n$ while determining the combination ratio on the predetermined combination ratio map stored in the ROM or the NVRAM. However, it is possible to switch the combination ratio map depending on a bank angle, a road gradient, or the like, of a road on which the self vehicle is driving.

In this case, the curve radius estimating part 112 may detect the bank angle, the road gradient, or the like, of the road on which the self vehicle is driving based on road information which a navigation system holds, or may detect the bank angle, the road gradient, or the like, of the road on which the self vehicle is driving based on a output of an inclination sensor and/or an acceleration sensor mounted on the self vehicle.

Also, the curve radius estimating part 112 chooses a specific combination ratio map corresponding to a specific bank angle from a plurality of combination ratio maps arranged for each bank angle so that the combination ratio $R_{ratio}$ increases with increase of the bank angle even if the vehicle is driving at the same vehicle speed V in the low speed area (15 kilometer per hour or less for example) (so that the contribution ratio of the curve radius $R_{yaw}$ calculated on the yaw rate against the estimate value $R_n$ becomes large).

This is because, the larger a bank angle at a curve is, the vehicle can pass through the curve with smaller steering angle, and therefore the contribution ratio of the curve radius $R_{str}$ calculated on the steering angle against the estimate value $R_n$ should be lowered.

Meanwhile, the value of the yaw rate is supposed to be corrected based on a value from an inclination sensor or an acceleration sensor which detects acceleration in the vertical direction (a gravitational acceleration for example). This is because, if there exist a bank angle, the value of the yaw rate detected by the yaw rate sensor 102 is affected by the gravitational acceleration.

Also, in the above embodiments, the curve radius estimating device 100 outputs the estimated curve radius to the inter-vehicular distance controlling device 200. However, the curve radius estimating device 100 may output the estimated curve radius to other in-vehicle devices such as a navigation system or a parking assistance device.

The invention claimed is:

1. A curve radius estimating device configured to estimate a curve radius of a lane on which a self vehicle is driving, comprising:
    a first curve radius calculating part configured to calculate a first curve radius based on a steering angle;
    a second curve radius calculating part configured to calculate a second curve radius based on a yaw rate; and
    a curve radius estimating part configured to estimate a curve radius by combining the first curve radius and the second curve radius in a weighted sum according to a predetermined combination ratio,
    wherein the curve radius estimating part increases a contribution ratio of the first curve radius to the estimated curve radius with decrease of a vehicle speed.

2. The curve radius estimating device according to claim 1, wherein the curve radius estimating part gradually increases a contribution ratio of the first curve radius to the estimated curve radius with decrease of a vehicle speed.

3. The curve radius estimating device according to claim 1, wherein the curve radius estimating part changes the predetermined combination ratio depending on a bank angle or a road gradient of a road on which the self vehicle is driving.

4. The curve radius estimating device according to claim 1, wherein the first radius calculating part calculates the first curve radius by dividing a wheelbase of the self vehicle by a tangent of the steering angle.

5. The curve radius estimating device according to claim 4, wherein the second radius calculating part calculates the second curve radius by dividing the vehicle speed by the yaw rate.

6. The curve radius estimating device according to claim 5, wherein the predetermined combination ratio is a value between zero and one.

7. The curve radius estimating device according to claim 6, wherein the curve radius estimating part estimates the estimated curve radius by adding the product of the second curve radius and the predetermined combination ratio with the produce of the first curve radius and one minus the predetermined combination ratio.

8. The curve radius estimating device according to claim 6, wherein the predetermined combination ratio varies as a series of discrete steps according to the vehicle speed.

9. The curve radius estimating device according to claim 6, wherein the predetermined combination ratio varies continuously according to the vehicle speed.

10. The curve radius estimating device according to claim 1, further comprising:
    a radar configured to measure a distance between the self vehicle and another vehicle; and
    an inter-vehicle distance controlling part configured to control the distance between the self vehicle and the other vehicle based on the estimated curve radius and an output of the radar.

11. A method of estimating a curve radius of a lane on which a self vehicle is driving, comprising:

calculating, in a first curve radius calculating part, a first curve radius based on a steering angle;

calculating, in a second curve radius calculating part, a second curve radius based on a yaw rate; and     estimating, in a curve radius estimating part, a curve radius by combining the first curve radius and the second curve radius in a weighted sum according to a predetermined combination ratio,     wherein the curve radius estimating part increases a contribution ratio of the first curve radius to the estimated curve radius with decrease of a vehicle speed.

12. The method according to claim 11, wherein a contribution ratio of the first curve radius to the estimated curve radius is gradually increased with decrease of a vehicle speed.

13. The method according to claim 11, wherein the predetermined combination ratio is changed depending on a bank angle or a road gradient of a road on which the self vehicle is driving.

14. The method according to claim 11, wherein the first curve radius is calculated by dividing a wheelbase of the self vehicle by a tangent of the steering angle.

15. The method according to claim 14, wherein the second curve radius is calculated by dividing the vehicle speed by the yaw rate.

16. The method according to claim 15, wherein the predetermined combination ratio is a value between zero and one.

17. The method according to claim 16, wherein the estimated curve radius is estimated by adding the product of the second curve radius and the predetermined combination ratio with the produce of the first curve radius and one minus the predetermined combination ratio.

18. The method according to claim 16, wherein the predetermined combination ratio varies as a series of discrete steps according to the vehicle speed.

19. The method according to claim 16, wherein the predetermined combination ratio varies continuously according to the vehicle speed.

20. The method according to claim 11, further comprising:

measuring, at a radar device, a distance between the self vehicle and another vehicle; and     controlling, at an inter-vehicle distance controlling part, the distance between the self vehicle and the other vehicle based on the estimated curve radius and an output of the radar.

\* \* \* \* \*